(12) United States Patent
Rivera et al.

(10) Patent No.: US 8,943,526 B2
(45) Date of Patent: *Jan. 27, 2015

(54) ESTIMATING ENGAGEMENT OF CONSUMERS OF PRESENTED CONTENT

(71) Applicant: Microsoft Corporation, Redmond, WA (US)

(72) Inventors: Javier Hernandez Rivera, Cambridge, MA (US); Zicheng Liu, Bellevue, WA (US); Geoff Hulten, Linwood, WA (US); Michael Conrad, Monroe, WA (US); Kyle Krum, Sammammish, WA (US); David DeBarr, Broadlands, VA (US); Zhengyou Zhang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/866,699

(22) Filed: Apr. 19, 2013

(65) Prior Publication Data

US 2013/0232515 A1 Sep. 5, 2013

Related U.S. Application Data

(63) Continuation-in-part of application No. 13/309,859, filed on Dec. 2, 2011, now Pat. No. 8,635,637.

(51) Int. Cl.
*H04N 9/00* (2006.01)
*H04N 7/16* (2011.01)
(Continued)

(52) U.S. Cl.
CPC ... *H04N 21/44218* (2013.01); *H04N 21/44213* (2013.01); *H04N 21/4667* (2013.01);
(Continued)

(58) Field of Classification Search
CPC ............. H04N 21/44213; H04N 21/4667; H04N 21/4532; H04N 21/4755; H04N 21/4756; H04N 21/4758; H04N 21/4826; H04N 21/44218
USPC ............. 725/10, 12; 705/14.41, 14.53, 14.66, 705/14.67
See application file for complete search history.

(56) References Cited

U.S. PATENT DOCUMENTS 4,931,865 A 6/1990 Scarampi
7,762,665 B2 * 7/2010 Vertegaal et al. ............. 351/209
(Continued)

OTHER PUBLICATIONS

McDuff, Daniel, "Affective Storytelling—Automatic Measurement of Story Effectiveness from Emotional Responses Collected over the Internet", Retrieved at <<http://web.media.mit.edu/~djmcduff/documents/McDuff_Thesis_Proposal.pdf>>, In Ph.D. Thesis, Jun. 6, 2012, pp. 1-16.

Ba, et al., "Recognizing Visual Focus of Attention from Head Pose in Natural Meetings", Retrieved at <<http://www.idiap.ch/~odobez/publications/BaOdobezSMC-B-2008-accepted.pdf>>, In IEEE Transactions on Systems, Man, and Cybernetics, Part B: Cybernetics—Special Issue on Human Computing, vol. 39, Issue 1, Feb. 2009, pp. 1-36.

(Continued)

*Primary Examiner* — Hoang-Vu A Nguyen-Ba
(74) *Attorney, Agent, or Firm* — Sandy Swain; Judy Yee; Micky Minhas

(57) ABSTRACT

Technologies described herein relate to estimating engagement of a person with respect to content being presented to the person. A sensor outputs a stream of data relating to the person as the person is consuming the content. At least one feature is extracted from the stream of data, and a level of engagement of the person is estimated based at least in part upon the at least one feature. A computing function is performed based upon the estimated level of engagement of the person.

20 Claims, 8 Drawing Sheets

(51) Int. Cl.
*G06Q 30/00* (2012.01)
*H04N 21/442* (2011.01)
*H04N 21/466* (2011.01)
*H04N 21/45* (2011.01)
*G06Q 30/02* (2012.01)

(52) U.S. Cl.
CPC ....... *H04N21/4532* (2013.01); *G06Q 30/0242* (2013.01); *G06Q 30/0269* (2013.01); *G06Q 30/0255* (2013.01); *G06Q 30/0271* (2013.01); *G06Q 30/02* (2013.01)
USPC ......... 725/10; 725/12; 705/14.41; 705/14.53; 705/14.66; 705/14.67

(56) References Cited

U.S. PATENT DOCUMENTS

| | | | |
|---|---|---|---|
| 8,096,660 B2 * | 1/2012 | Vertegaal et al. | 351/209 |
| 8,322,856 B2 * | 12/2012 | Vertegaal et al. | 351/209 |
| 2009/0070798 A1 | 3/2009 | Lee et al. | |
| 2010/0070987 A1 * | 3/2010 | Amento et al. | 725/10 |
| 2010/0169157 A1 * | 7/2010 | Muhonen et al. | 705/10 |
| 2011/0038547 A1 | 2/2011 | Hill | |
| 2011/0263946 A1 | 10/2011 | El Kaliouby et al. | |
| 2012/0324491 A1 * | 12/2012 | Bathiche et al. | 725/10 |
| 2013/0014144 A1 | 1/2013 | Bhatia et al. | |

OTHER PUBLICATIONS

Asteriadis, et al., "Estimation of Behavioral User State based on Eye Gaze and Head Pose—Application in an e-Learning Environment", Retrieved at <<http://manolito.image.ece.ntua.gr/papers/571.pdf>>, In Journal of Multimedia Tools and Applications, vol. 41, Issue 3, Feb. 2009, pp. 1-25.

Akker, et al., "Supporting Engagement and Floor Control in Hybrid Meeting", Retrieved at <<http://130.203.133.150/viewdoc/download;jsessionid=9C257851317FD4360A19B491D3848B29?doi=10.1.161.2796&rep=rep1&type=pdf>>, In Cross-Modal Analysis of Speech, Gestures, Gaze and Facial Expressions, Jul. 2009, pp. 1-15.

Ba, et al., "Head Pose Tracking and Focus of Attention Recognition Algorithms in Meeting Rooms", Retrieved at <<http://www.idiap.ch/~odobez/publications/BaOdobezCLEAR2006.pdf>>, In Proceedings of the 1st International Evaluation Conference on Classification of Events, Activities and Relationships, Apr. 6, 2006, pp. 1-12.

Boser, et al., "A Training Algorithm for Optimal Margin Classifiers", Retrieved at <<http://citeseerx.ist.psu.edu/viewdoc/download;jsessionid=87B8384B55CF6E73E4414C47482FDFB9?doi=10.1.1.3818&rep=rep1&type=pdf>>, In Proceedings of the Fifth Annual Workshop on Computational Learning Theory, Jul. 27, 1992, pp. 1-9.

Bradley, et al., "Measuring Emotion: The Self-Assessment Manikin and the Semantic Differential", Retrieved at <<http://www.cnbc.pt/jpmatos/29.%20Bradley.pdf>>, In Journal of Behavior Therapy and Experimental Psychiatry, vol. 25, Issue 1, Mar. 1994, pp. 1-11.

Chang, et al., "LIBSVM: A Library for Support Vector Machines", Retrieved at <<http://www.csie.ntu.edu.tw/~cjlin/libsvm/>>, Retrieved Date: Apr. 1, 2013, pp. 1-4.

Kaliouby, et al., "Real Time Inference of Complex Mental States from Facial Expressions and Head Gestures", Retrieved at <<http://citeseerx.ist.psu.edu/viewdoc/download?doi=10.1.1.108.3049&rep=rep1&type=pdf>>, In Proceedings of Conference on Computer Vision and Pattern Recognition Workshop, Jun. 27, 2004, pp. 1-20.

Grace, et al., "A Drowsy Driver Detection System for Heavy Vehicles", Retrieved at <<http://ieeexplore.ieee.org/stamp/stamp.jsp?tp=&arnumber=739878>>, In Proceedings of the 17th Digital Avionics Systems Conference, vol. 2, Oct. 31, 1998, pp. 1-8.

Guyon, et al., "An Introduction to Variable and Feature Selection", Retrieved at <<http://citeseerx.ist.psu.edu/viewdoc/download?doi=10.1.1.3.8934&rep=rep1&type=pdf>>, In Journal of Machine Learning Research, vol. 3, Mar. 2003, pp. 1-26.

Kapoor, et al., "Multimodal Affect Recognition in Learning Environments", Retrieved at <<http://affect.media.mit.edu/pdfs/05.kapoor-picard.pdf>>, In Proceedings of the 13th Annual ACM International Conference on Multimedia, Nov. 6, 2005, pp. 1-6.

Liang, et al., "Face Alignment via Component based Discriminative Search", Retrieved at <<http://research.microsoft.com/en-us/um/people/jiansun/papers/ECCV08_FaceAlign.pdf>>, In Proceedings of the 10th European Conference on Computer Vision: Part II, Oct. 12, 2008, pp. 1-14.

McDuff, et al., "Crowdsourcing Facial Responses to Online Videos", Retrieved at <<http://ieeexplore.ieee.org/stamp/stamp.jsp?tp=&arnumber=6226351>>, In Proceedings of the IEEE Transactions on Affective Computing, vol. 3, Issue 4, Oct. 2012, pp. 1-13.

McDuff, et al., "AffectAura: An Intelligent System for Emotional Memory", Retrieved at <<http://research.microsoft.com/en-us/um/people/akapoor/papers/chi2012.pdf>>, In Proceedings of the SIGCHI Conference on Human Factors in Computing Systems, May 5, 2012, pp. 1-10.

Peacock, et al., "Which Broadcast Medium Better Drives Engagement? Measuring the Powers of Radio and Television with Electromyography and Skin-Conductance Measurements", Retrieved at <<http://www.gallup-robinson.com/reprints/broadcast_medium_drives_engagement.pdf>>, In Journal of Advertising Research, vol. 51, Issue 4, Dec. 2011, pp. 1-8.

Poels, et al., "How to Capture the Heart? Reviewing 20 Years of Emotion Measurement in Advertising", Retrieved at <<https://lirias.kuleuven.be/bitstream/123456789/228488/1/MO_0605.pdf>>, In the Journal of Advertising Research, vol. 46, Issue 1, Mar. 2006, pp. 1-48.

Viola, et al., "Robust Real-Time Face Detection", Retrieved at <<http://www.vision.rwth-aachen.de/teaching/cvws08/additional/viola-facedetection.ijcv04.pdf>>, In International Journal of Computer Vision, vol. 57, Issue 2, May 2004, pp. 1-18.

Voit, et al., "Deducing the Visual Focus of Attention from Head Pose Estimation in Dynamic Multi-View Meeting Scenarios", Retrieved at <<http://130.203.133.150/viewdoc/download?doi=10.1.215.748&rep=rep1&type=pdf>>, In Proceedings of the 10th International Conference on Multimodal Interfaces, Oct. 20, 2008, pp. 1-8.

Wedel, et al., "Eye Fixations on Advertisements and Memory for Brands: A Model and Findings", Retrieved at <<http://bear.warrington.ufl.edu/centers/MKS/articles/799516.pdf>>, In Journal of Marketing Science, vol. 19, Issue 4, Oct. 2000, pp. 1-16.

Wood, Orlando, "Using Faces; Measuring Emotional Engagement for Early Stage Creative", Retrieved at <<http://www.brainjuicer.com/xtra/FaceTrace_-_Measuring_Emotional_Engagement_-_ESOMAR_Congress_2007.pdf>>, In ESOMAR, Best Methodology, Annual Congress, Sep. 19, 2007, pp. 1-29.

Zhang, et al., "Head Pose Estimation in Seminar Room Using Multi View Face Detectors", Retrieved at <<http://www.clear-evaluation.org/clear06/?download=paper_zhang.pdf, In Proceedings of the 1st International Evaluation Conference on Classification of Events, Activities and Relationships, Mar. 30, 2006, pp. 1-7.

* cited by examiner

ESTIMATING ENGAGEMENT OF CONSUMERS OF PRESENTED CONTENT

RELATED APPLICATION

This application is a continuation in part of U.S. patent application Ser. No. 13/309,859, filed on Dec. 2, 2011, and entitled "USER INTERFACE PRESENTING A MEDIA REACTION," the entirety of which is incorporated herein by reference.

BACKGROUND

Advertisers, television producers, those involved in the movie business, and other media providers have an interest in understanding engagement levels of consumers with respect to their content, as granularly as possible. For instance, prior to a television pilot being aired by a broadcaster, the broadcaster typically holds a preview for such pilot that is viewed by a test group. Members of the test group are monitored to ascertain their respective levels of engagement as to the pilot program in its entirety as well as to respective levels of engagement as to particular portions of the pilot, particular actors, etc. Generally, members of the test group are requested to set forth explicit feedback regarding their perception of the pilot program, actors included therein, advertisements that may be effective when paired with such program, etc.

In other examples, companies provide surveys to television viewers asking such viewers to provide their respective feedback about certain programs. Additionally, television ratings are monitored to ascertain popularity thereof, where fees charged to advertisers is often a function of popularity of content with respect to which an advertisement is to be presented. Surveys, however, are relatively easily manipulated, and as more and more people time shift their viewing of television programs (e.g., through viewing content through an Internet-connected application, through utilization of a digital video recorder (DVR), . . . ), it has become increasingly difficult to accurately determine popularity of a program.

Furthermore, with respect to an individual person, there currently exists no suitable technique for determining an interest level of the person with respect to the content being presented thereto. For example, the person may be presented with a television program or movie, and the person may pay very little attention to such television program or movie. An advertiser may wish to target the advertisement to the person when engaged versus when the person is not engaged.

SUMMARY

The following is a brief summary of subject matter that is described in greater detail herein. This summary is not intended to be limiting as to the scope of the claims.

Described herein are various technologies pertaining to automatically, and optionally in real-time, ascertaining a level of engagement of a person with respect to content presented to the person. For example, a sensor can be configured to output a data stream, where the data stream relates to the person who is being presented with the content. The sensor may be, for instance, a video camera (e.g. a red-green-blue camera), a depth sensor, a motion sensor, a microphone, a temperature sensor, a humidity sensor, a gyroscope of a mobile device of the person, etc. It is to be noted that the sensor outputs the data stream without the sensor receiving explicit feedback from the person about the content being presented thereto. The content may be any suitable content that can be consumed by the person, such as a television program, an advertisement, a lecture (video or live), a concert, a theatrical performance, a video game, a sporting event, web page, a web-based video, an audio clip, a song, etc.

The data stream output by the sensor is received at a computing device, and at least one feature of the person is extracted from the data stream. In a non-limiting example, the sensor may be a video camera and the feature of the person extracted from a video feed output by the video camera can be position of recognized points on the face of the person (eyes, center of the nose, corners of the mouth), distances between the recognized points, and angles between the recognized points. Other exemplary features that can be extracted from the video feed can include head roll of the person (e.g., a rotation of the head of the person relative to a horizontal plane), head size of the person (e.g., area of the detected head in the video feed), and head position (location of the head in the video feed). Such features, for instance, can be employed to detect when the person is leaning forward or backward, or nodding or shaking her head. Utilization of other sensors together with the video camera may allow for other features of the person to be identified, such as relative position of the head to a remainder of the body of the person, detection of an activity being undertaken by the person, identifying certain words uttered by the person (e.g., which may be indicative of high or low level of engagement with respect to presented content), etc.

In yet another example, a feature can be extracted from sensor data that indicates that the person is using a device to interact with content, such as a remote control, a gaming controller with a display screen thereon, a computing device that can be used to interact with content being presented (or display additional content), etc. In such a case, the person may be highly engaged with the content being presented while not looking at a display screen that is displaying the content. Still other features that can be extracted and considered can include whether the person is talking to another person in the same room, whether the person is directing speech towards presented content, the blink rate of the individual (e.g., when the blink rate of the person rises, attention level decreases).

Based at least in part upon the at least one feature extracted from the stream of data output by the sensor, a level of engagement of the person can be estimated with respect to the content being presented to the person. For instance, the level of engagement can be estimated as being a particular level amongst a plurality of potential levels (e.g., no engagement, low engagement, medium engagement, and high engagement). Hence, if the stream of data output by the sensor captures the person with her head turned away from the content being presented to the person, and remaining turned away for a relatively large amount of time, then it can be estimated that the person has a relatively low level of engagement with respect to the content being presented thereto. Alternatively, if features extracted from the data stream output by the sensor indicate that the person is leaning forward with her head directed at the content being presented thereto, then it can be estimated that the person has a relatively high level of engagement with respect to such content.

Responsive to the engagement of the person with respect to the content being estimated, at least one processing function can be undertaken based upon such estimated level of engagement. For instance, a recommendation algorithm can be updated based upon the engagement of the person with respect to the content being presented thereto. Therefore, a recommender system can provide more relevant recommendations to the person, since the engagement of the viewer with respect to certain content can be ascertained. In another example, an advertisement can be selectively presented to the person as a function of the estimated level of engagement of the person with respect to content being presented thereto. In still another example, a content provider can be provided with a notification pertaining to the estimated level of engagement of the person, thereby allowing the content provider to receive relatively accurate feedback as to how engaged the person (and optionally other people) is when being presented with the content. In still yet another example, the person may wish to be notified when such person is subconsciously becoming less engaged with content that is being presented to the person, such as when the person is attempting to listen to a lecturer, when the person is in a meeting, etc.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
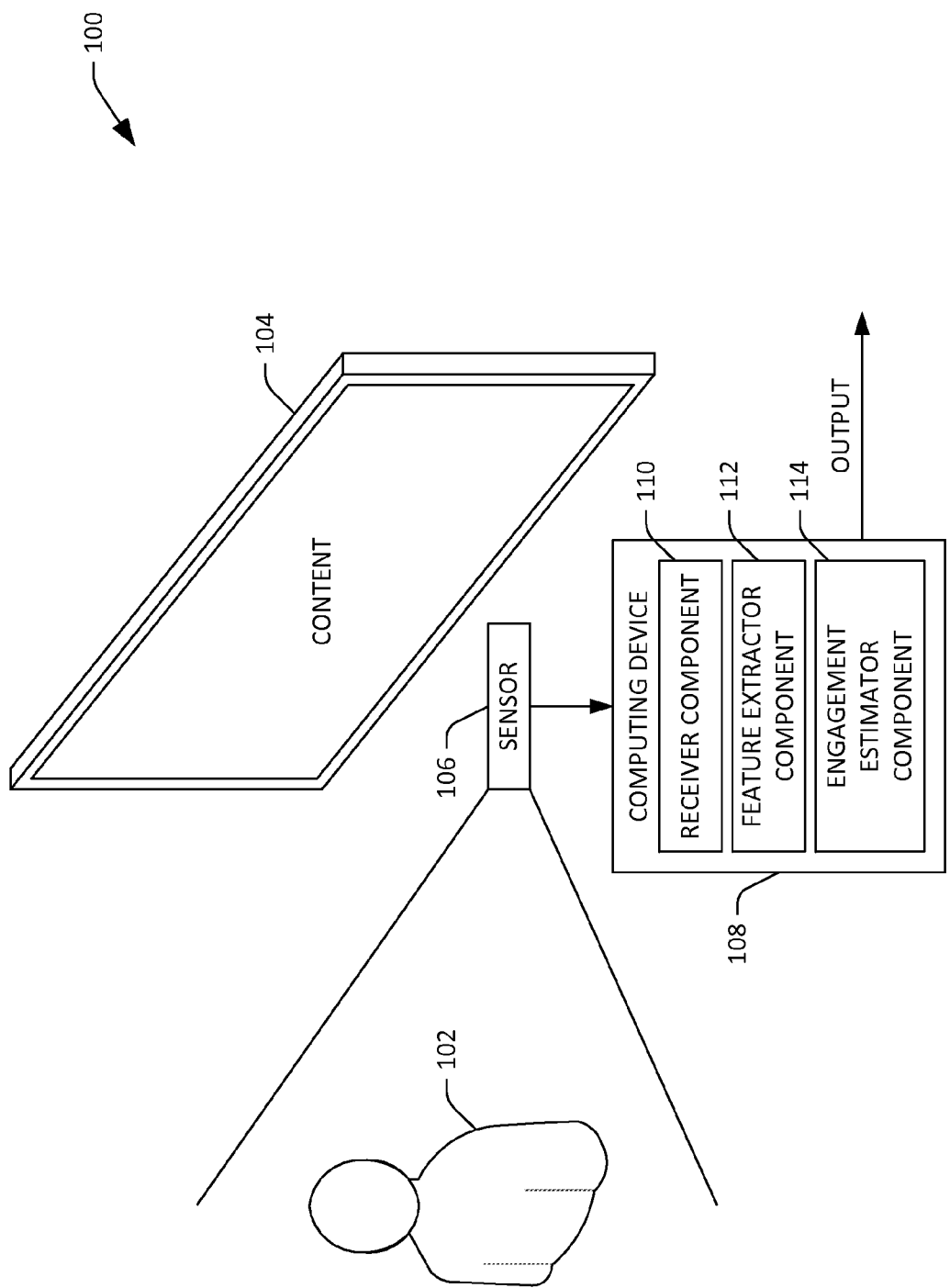
FIG. 1 is a functional block diagram of an exemplary system that facilitates estimating a level of engagement of a person with respect to content being presented to the person.

Various technologies pertaining to estimating levels of engagement of respective people who are being presented with content are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Additionally, as used herein, the term "exemplary" is intended to mean serving as an illustration or example of something, and is not intended to indicate a preference.

Described herein are aspects pertaining to estimating a level of engagement of a person with respect to content that is presented to such person. Engagement of the person indicates whether the person is likely to be paying attention to the content. As will be described in greater detail herein, engagement of the person can be estimated based upon sensor data received for such person. In a non-limiting example, the sensor data can include head and skeletal orientation as follows:

Time 1: head orientation: 0°; skeletal orientation: upper torso forward of lower torso;

Time 2: head orientation: 2°; skeletal orientation: upper torso forward of lower torso;

Time 3: head orientation: 5°; skeletal orientation: upper torso approximately even with lower torso;

Time 4: head orientation: 2°; skeletal orientation: upper torso back from lower torso;

Time 5: head orientation: 16°; skeletal orientation: upper torso back from lower torso time;

Time 6: head orientation: 37°; skeletal orientation: upper torso back from lower torso;

Time 7: head orientation: 5°; skeletal orientation: upper torso forward of lower torso;

Time 8: head orientation 1°; skeletal orientation: upper torso forward of lower torso.

Based on the sensor data, the following corresponding engagement can be determined for the person:

Time 1: engagement high;
Time 2: engagement high;
Time 3: engagement medium high;
Time 4: engagement medium;
Time 5: engagement medium low;
Time 6: engagement low;
Time 7: engagement high;
Time 8: engagement high.

Accordingly, for example, at times 1, 2, 7, and 8, it can be determined, based on the sensor data indicating a 5° or less deviation of the head of the person looking directly at a display presenting content and skeletal orientation of upper torso forward of lower torso (indicating that the person is leaning forward to the media presentation), that the person is highly engaged in the content presented at such times.

At time 3, it can be determined that the engagement of the person has fallen due to the person no longer leaning forward. At time 4, it can be determined that the engagement of the person has fallen further to medium, based on the person detected as leaning back, even though such person is still looking almost directly at the presented content.

At times 5 and 6, it can be determined that the person is less engaged, falling to medium-low, and then low engagement, based on the person still leaning back and looking slightly away (16°) and then significantly away (37°), respectively. It can be noted that at time 7, the person quickly returns to the state of high engagement, which media creators may be interested in, as it indicates content found to be exciting or otherwise captivating by the person.

Based upon the estimated states of engagement, the estimated engagements can be provided to various entities. Such entities may be advertisers, media creators, and media providers. Providing such information to an advertising entity or media provider can be effective to enable the advertising entity to measure a value of their advertisements shown during a media program or the media provider to set advertisement costs. Providing such information to a media creator can be effective to enable the media creator to assess a potential value of a similar media program or portion thereof. For example, a media creator, prior to releasing the media program to the general public, may determine portions of the media program that are not well received, and thus alter the media program to improve it. Information pertaining to engagement may also be provided to other entities as well. Providing such information to a rating entity, for example, can be effective to enable the rating entity to automatically rate the media program for the person.

With reference now to FIG. 1, an exemplary system 100 that facilitates estimating engagement of a person with respect to content being presented thereto is illustrated. A person 102 is presented with content, shown here as being displayed on a display apparatus 104. For example, the display apparatus 104 may be a television, a movie theater screen, a screen of a computing device (e.g., desktop computer screen, laptop computer screen, tablet or slate computer screen, telephone screen, etc.). Accordingly, the content presented to the person 102 maybe a television program, a film, an advertisement, some other form of video, a web page, a live video feed, or other content that may be presented on the display apparatus 104. It is to be understood, however, that content not displayable on the display apparatus 104 may also be presented to the person 102. For example, the content presented to the person 102 may be audio content, such as a song, a lecture, etc. In yet another example, the content may be a live presentation, such as a theatrical performance, a concert, a sporting event, a live lecture, a comedy show, or other content that can be consumed by the person 102.

A sensor 106 is configured to output a stream of data relating to the person 102 while the person 102 is being presented with the content. In the exemplary system 100, the sensor 106 is a non-intrusive sensor, in that the person 102 need not wear the sensor 106 or provide explicit feedback about the content being presented to the person 102 for the sensor 106 to capture information pertaining to the engagement of the person 102 with respect to the content. Accordingly, the sensor 106 may be a video camera, such as a web cam or other video camera installed in computing devices, a depth sensor, a microphone, a gyroscope in a mobile device of the person 102 (such that movement of the person 102 can be ascertained), a temperature sensor, a humidity sensor, a location sensor, etc. The data stream output by the sensor 106 can capture various features relating to the person 102 such as facial expressions of the person 102, head pose, head size, head location, audible feedback of the person 102, which may indicate that the person 102 is either highly engaged or not engaged with the content, an activity being undertaken by the person 102 when being presented with the content (e.g., talking on a telephone, reading a book, eating), a number of people being presented with the content together with the person 102, amongst other features relating to the person 102.

The system 100 comprises a computing device 108 that is in communication with the sensor 106 and receives the stream of data output by the sensor 106. While shown as being separate from the computing device 108, in other embodiments the sensor 106 may be integral to the computing device 108. Thus, for example, the computing device 108 may be a tablet computing device, a laptop computing device, a display with the sensor 106 integral thereto, etc. In another example, the computing device 108 may be a gaming console, a media player (e.g., a computing device configured to present audio/video content by way of the display apparatus 104 to the person 102), a set top box, etc.

The computing device 108 includes a receiver component 110 that receives the stream of data from the sensor 106. The computing device 108 additionally includes a feature extractor component 112, that, for example, in real-time, can extract features of the person 102 from the stream of data. In an exemplary embodiment, the feature extractor component 112 can extract features indicative of the facial expression of the person 102 from the stream of data received from the sensor 106. As will be described in greater detail below, such features can include points of interest on the face of the person 102 (eyes, center of the nose, corners of the mouth) and distances and angles pertaining to such facial points. Furthermore, if the sensor 106 is a video camera, the feature extractor component 112 can extract features relating to pose of the head of the person 102. Such features may include, but are not limited to, head roll, head size, and head position. "Head roll" refers to the rotation of the head of the person 102, which can be calculated based upon an angle between a line connecting the eyes of the person and defined horizontal plane. "Head size" refers to the area in the video feed of the detected head (which can be normalized). "Head position" refers to location of the head in the video feed.

In still yet another example, the feature extractor component 112 can be configured to identify activities undertaken by the person 102 as can be inferred through analysis of the stream of data output by the sensor 106. For example, the feature extractor component 112 can be configured to identify a set of predetermined activities of the person 102, such as eating, talking, sleeping, walking, reading, etc. Still further, the feature extractor component 112 can extract skeletal features of the person 102, such as to identify three dimensional position of the person 102, as well as gestures performed by the person 102. Such features can be indicative of whether the person 102 is sitting up straight or slouching, etc. Furthermore, if the sensor 106 is configured to capture audible data, the feature extractor component 112 can be configured to identify particular keywords that are known to correlate to engagement of the person 102 with respect to content. Similarly, silence of the person 102 may indicate that the person 102 is highly engaged with the content. Still other features that can be extracted by the feature extractor component 112 from sensor data include whether the eyes of the person 102 are open or closed, blinking of the person 102, whether the person 102 is laughing or other audio indicator, expressions of the person 102 (frowning, yawning, smiling, etc.), body posture of the person 102, spatial relationship (e.g., relative distance and orientation) between the person and another person (or persons), between the person and an object (or objects), etc. It is to be understood that the above-mentioned features are an exemplary set of features that may be employed, and that not all features need be utilized to estimate the engagement of the person 102 with respect to the content being presented thereto, and that other features may also be employed to estimate the engagement of the person 102 with respect to the content.

An engagement estimator component 114 estimates a level of engagement of the person 102 with respect to the content being presented to the person 102 based at least in part upon the features extracted from the data stream by the feature extractor component 112. The computing device 108 is then configured to perform at least one computing function based upon the level of engagement of the person 102 estimated by the engagement estimator component 114 with respect to the presented content. Exemplary computing functions, some of which will be described in greater detail below, can include outputting a notification as to the engagement of the person 102 to a provider of the content, outputting a notification to an advertiser who may wish to present an advertisement to the person 102 based upon the estimated level of engagement of the person 102 with respect to the content, updating a recommendation system based upon the estimated level of engagement of the person 102 with respect to the content, outputting a notification to the person 102 to inform the person 102 when it is estimated that such person 102 is highly engaged or is losing engagement with respect to the content, aggregating the estimated engagement of the person 102 with respect to the content with estimated levels of engagement of other persons, such that an aggregation of engagement with respect to the content over certain times can be ascertained, etc.

Figure 2:
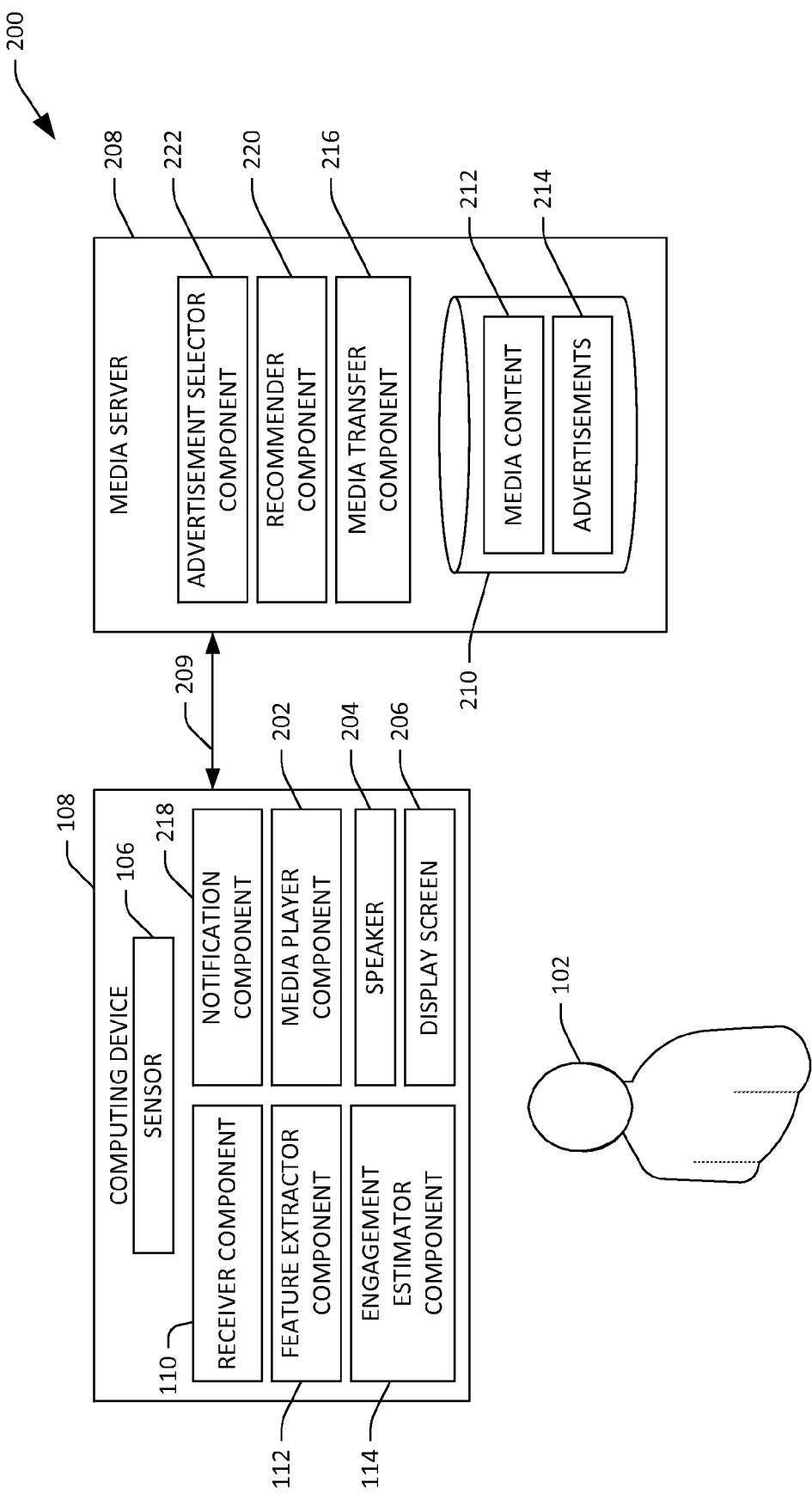
FIG. 2 is a functional block diagram of an exemplary system that facilitates estimating a level of engagement of a person being presented with content and performing at least one computing function based upon the estimated level of engagement.

With reference now to FIG. 2, exemplary system 200 that facilitates estimating a level of engagement of the person 102 with respect to content being presented thereto is illustrated. The system 200 includes the computing device 108, which is shown as including the sensor 106. The person 102 is being presented with content, and the sensor 106 is configured to output a data stream relating to the person 102 as the person consumes such content. The receiver component 110 receives the data stream output by the sensor 106, and the feature extractor component 112 extracts a feature pertaining to the person 102 from the stream of data output by the sensor 106. As noted above, the engagement estimator component 114 estimates a level of engagement of the person 102 with respect to content being presented thereto.

In the example system 200, the computing device 108 includes a media player component 202 that is configured to present content to the person. Specifically, the computing device 108 may include a speaker 204 and a display screen 206, wherein the media player component 202 can cause the speaker 204 to output audible content and the display screen 206 to output video content, such that, for instance, a television program, a film, or the like, can be presented to the person 102.

In an exemplary embodiment, the media player component 202 may be a computer-executable application installed on the computing device 108 that is configured to communicate with a media server 208 by way of a suitable network connection 210 to retrieve content for presentment to the person 102. Pursuant to an example, the media server 208 comprises a data repository 210 that includes media content 212 that can be accessed and presented to the person 102 by the media player component 202. For example, the media player component 202 may be a portion of a subscription-based service that allows the person 102 to retrieve desired content upon selection thereof by way of the media player component 202. In another example, the media player component 202 can be a one-time content presentation service, wherein the person 102 can access a content library by way of the media player component 202 and pay for particular content that is desirably presented to the person 102 (e.g., for rental or purchase).

The data repository 210 may also include a plurality of advertisements 214 that can be presented to the person 102. The media server 208 includes a media transfer component 216 that causes media selected by the person 102 to be transferred to the computing device 108 by way of the network connection 209. The media transfer component 216, in an example, can transfer media upon the person 102 indicating a selection of such media by way of the media player component 202. In another embodiment, the media transfer component 216 can automatically present the media content 212 to the person 102, such as when the media transfer component 216 is a portion of a cable or satellite television provider (e.g., the media transfer component 216 transfers appropriate media content depending upon a schedule).

As noted above, as a function of features extracted by the feature extractor component 112 from the stream of data output by the sensor 106, the engagement estimator component 114 can estimate a level of engagement of the person 102 with respect to content presented thereto by the media player component 202. The computing device 208 may further include a notification component 218 that outputs a notice to the media server 208 pertaining to the engagement of the person as estimated by the engagement estimator component 114. The media server 208 includes a recommender component 220 that is configured to output recommended content to the person 102 based upon what is believed to be of interest to the person 102. In the example set forth here, the recommender component 220 can be modified based at least in part upon the content presented to the person 102 by the media player component 202 and the estimated engagement of the person 102 with respect to such content. For instance, if during the duration of the content presented to the person 102 by the media player component 202, the engagement estimator component 114 estimates that the person 102 is highly engaged, the recommender component 220 can be updated such that subsequent recommendations may be for content that is similar to the content viewed by the person 102. In contrast, if the engagement estimator component 114 estimates that the person 102 has a relatively low level of engagement with respect to content presented thereto by the media player component 202, then the recommender component 220 can be updated such that such component 220 will fail to provide recommendations similar to the content presented to the person 102.

The media server 208 may also include an advertisement selector component 222 that can present an advertisement to the person 102 based at least in part upon an estimated level of engagement of the person 102 with respect to content presented thereto by the media player component 202. For instance, an advertiser may wish to present an advertisement to the person 102 when the person is highly engaged with what is being presented thereto by the media player component 202. Thus, the estimated level of engagement can be used by the advertisement selector component 222 to determine when to present an advertisement to the person 102. In another example, the advertisement selector component 222 can select an advertisement from the advertisements 214 in the data repository 210 based upon the estimated engagement of the person 102 and the content being presented to the person by the media player component 202. Thus, for instance, if it is ascertained by the engagement estimator component 114 that the person 102 is highly engaged with content being presented by the media player component 202, the advertisement selector component 222 can select an advertisement from the advertisements 214 that in some way relates to the content being provided to the person 102. In a non-limiting example, if it is found that the person 102 is highly engaged when a car chase scene in a movie is being presented to the person 102, then the advertisement selector component 222 can select an automobile advertisement from the plurality of advertisements 214. Furthermore, the advertiser can be charged as a function of the estimated level of engagement of the person 102 when being presented with the advertisement (e.g., an advertiser is charged a higher fee when the viewer is highly engaged).

While the receiver component 110, the feature extractor component 112, and the engagement estimator component 114 have been shown in FIGS. 1 and 2 as being included in the computing device 108, it is to be understood that any or all of such components can be included in the media server 208 or some other computing device.

Figure 3:
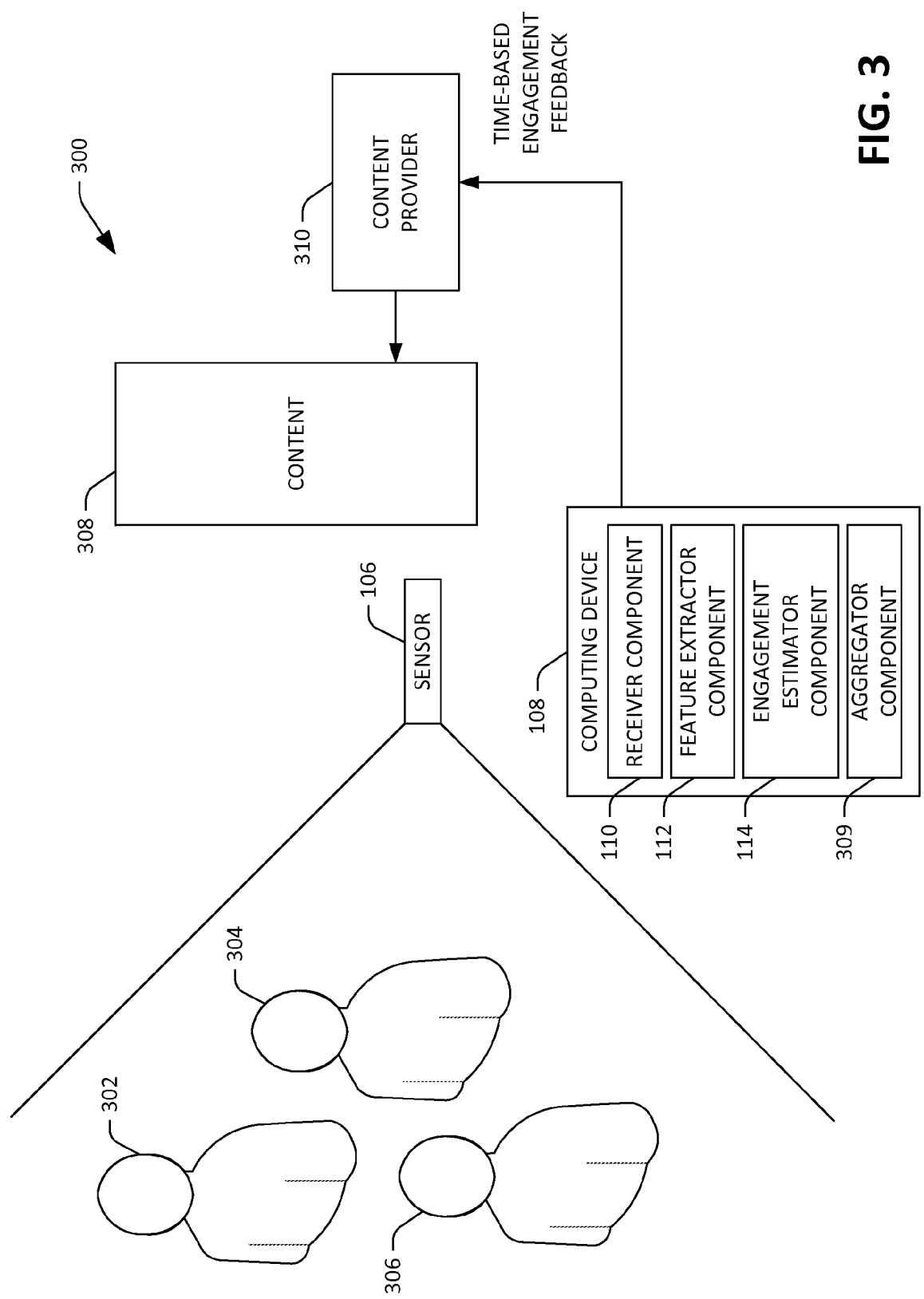
FIG. 3 is a functional block diagram of an exemplary system that facilitates provision of feedback to a content provider as to estimated levels of engagement of respective consumers of such content.

Turning now to FIG. 3, another exemplary system 300 that facilitates estimating the engagement of people with respect to content being presented thereto is illustrated. In this example, several persons 302-306 are being presented with content 308. While shown as being in a single location, is to be understood that the persons 302-306 can be presented with the content 308 in different locations. For purposes of the example shown in FIG. 3, however, persons 302-306 can be together, such as in a movie theater, sporting event, or the like. The sensor 106 outputs a stream of data relating to the persons 302-306 while the content 308 is being presented to such persons 302-306. The receiver component 110 of the computing device 108 receives the stream of data from the sensor 106, and the feature extractor component 112 extracts features of the persons 302-306 captured in the stream of data. The engagement estimator component 114, for each person in the persons 302-306, can estimate a respective level of engagement. The engagement estimator component 114 can perform such estimation in real-time, such that levels of engagement of the persons 302-306 can be estimated and analyzed over time.

The computing device 108 further includes an aggregator component 309 that can aggregate estimated engagement levels of the persons 302-306. Thus, the aggregator component 309 is configured to provide a global view of engagement of persons who are being presented with the content 308. The aggregator component 309 can output time-based engagement feedback to a content provider 310 that is providing the content 308. Such time-based engagement feedback can indicate, for example, that between time 1 and time 2, viewers of the content 308 are relatively highly engaged, while between time 2 and time 3, the persons 302-306 are collectively somewhat less engaged. This may allow the content provider 310 to make changes in the content 308, thus providing a better final product to consumers.

In a non-limiting example, the content provider 310 may be a lecturer of a class or public speaker that is setting forth a presentation. The sensor 106 can output a data stream relating to the persons 302-306 as they are presented with such presentation, and the engagement estimator component 114 can estimate their respective levels of engagement with respect to the content 308 over time. The aggregator component 309 can aggregate these respective levels of engagement, thereby providing the content provider 310 (the public speaker) with feedback, which the content provider 310 can use to ascertain which parts of the presentation are captivating the audience, and further ascertain which parts of the presentation are less captivating to the audience.

In an exemplary embodiment, the engagement estimator component 114 can estimate an engagement level of at least one of the persons 302-306, and can provide real-time feedback to the content provider 310. In an example, the content provider 310 may be a lecturer that is lecturing to students in a classroom (e.g., in person or in a virtual environment, where the lecturer is remote from the students). The engagement estimator component 114 can estimate a level of engagement of at least one of the students, or the students in the aggregate, and provide real-time feedback to the lecturer. Such feedback can indicate that the students' engagement is waning, thereby indicating to the lecturer to "spice up" the lecture, take a short break, etc.

Figure 4:
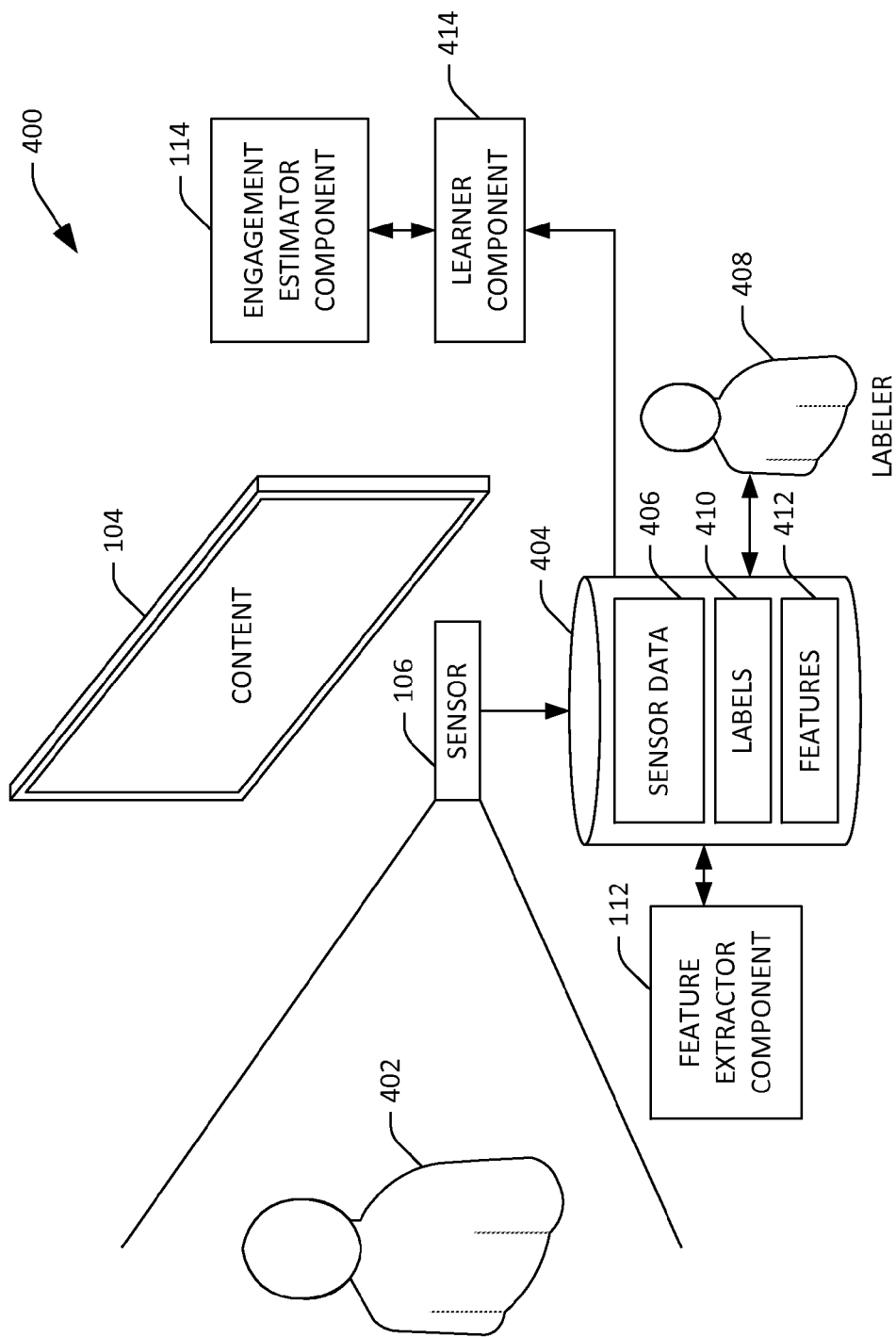
FIG. 4 is a functional block diagram of an exemplary system that facilitates training a computer-implemented model for estimating levels of engagement of consumers of content.

Now referring to FIG. 4, an exemplary system 400 that facilitates learning the engagement estimator component 114 is illustrated. In the exemplary system 400, the sensor 106 is described as a red-green-blue (RGB) video camera, and the feature extractor component 112 is described as extracting features from a video feed output by the RGB video camera. It can be recognized, however, that the sensor 106 may be any of the types of sensors set forth above, and that features extracted by the feature extractor component 112 can be any of the features noted above. To collect data, in connection with learning the engagement estimator component 114, a test subject 402 can be provided with content on the display apparatus 104. The environment where data is collected from the test subject 402 can be a relatively natural setting, where people typically consume content 104, such as in the home of the test subject 402 or a simulated home, wherein the test subject 402 may have access to food, beverages, an Internet connection, magazines, etc. The sensor 106 outputs a video feed as the test subject 402 views the content set forth on the display apparatus 104, and such video feed is retained in a data repository 404 as sensor data 406.

A human labeler 408 can play back the video (the sensor data 406), wherein the human labeler 408 is experienced in labeling engagement of subjects in video. The human labeler 408 can be provided with instructions as to how to assign labels of engagement of the test subject 402 as the test subject 402 views the content 104. For instance, the human labeler 408 can assign, for various windows of time in the sensor data 404, the engagement of the test subject 402 as being one of high engagement, medium engagement, low engagement, or no engagement. For instance, high engagement can indicate that the main focus of the test subject 402 is on the content presented in the display apparatus 104, and the test subject 402 is eager to move past distractions to return to viewing the content. Medium engagement can indicate that a main focus of the test subject 402 is on the content, but the test subject 402 is also aware of other distractions in the environment and may check e-mail, chat, etc. The human labeler 408 can label the engagement of the test subject 402 as being low engagement if the human labeler 408 determines that the main focus of the test subject 402 is on something other than the content presented on the display apparatus 104, but the test subject 402 may, from time to time, view the content. The human labeler 408 can be instructed to assign an engagement level of "no engagement" if a main focus of the test subject 402 is on something other than the content presented to the test subject 402 on the display apparatus 404. For example, when watching the sensor data 406, the human labeler 408 can annotate state changes between the above-mentioned engagement states. The human labeler 408 thus assigns labels to the sensor data 406 indicating the engagement of the test subject 402 over the time that the test subject 402 is presented with the content. This can cause a label to be assigned to each frame of the sensor data 406. The human labeler 408 can repeat the acts of labeling for multiple test subjects, and labels can be associated with frames of the sensor data 406 and retained in the data repository 404 as labels 410.

The feature extractor component 112 may then be configured to extract features from the sensor data 404 over time, such that, for example, feature values are identified for each frame in the sensor data 404. Exemplary features that may be extracted by the feature extractor component 112 have been set forth above, and extracted features are retained in the data repository 404 as features 412. Exemplary features extracted by the feature extractor component 112 from the video feed can include, but are not limited to, head pose, facial expressions (as identified from face distances and angles), head roll, head size and head position. Again, such features can be computed by the feature extractor component 112 on a frame by frame basis.

Figure 5:
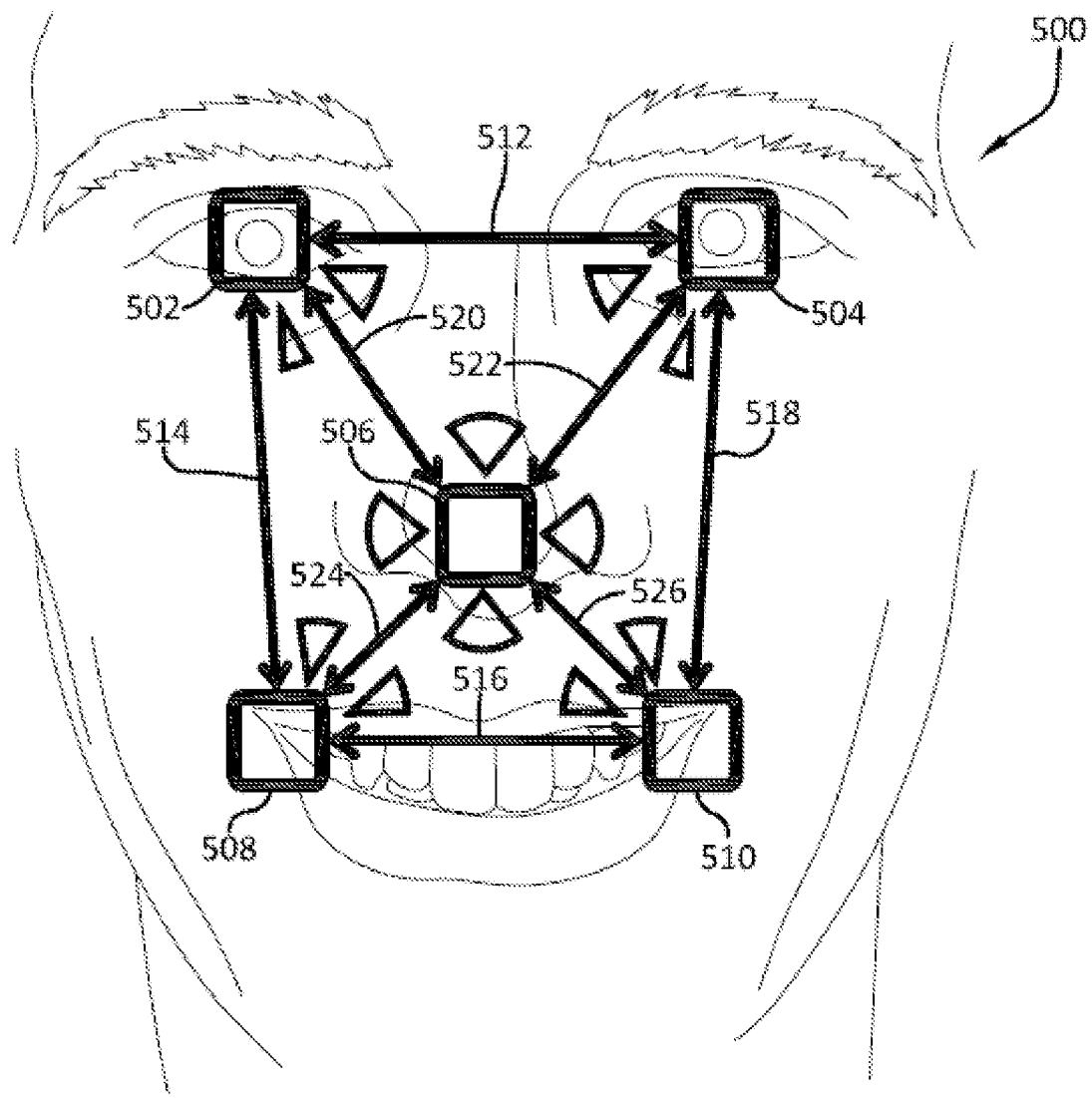
FIG. 5 illustrates exemplary features that can be extracted from a video feed that can be employed in connection with estimating a level of engagement of a consumer of content.

Turning briefly to FIG. 5, an exemplary depiction 500 of face distances and angles that can be extracted from a video feed by the feature extractor component 112 is illustrated. The feature extractor component 112 can identify a face of a consumer of content and can locate five facial points on such face. Such points include the pair of points 502 and 504 that correspond to the eyes of the consumer of the content, a point 506 corresponding to a center of the nose of the consumer of the content, and a pair of points 508 and 510 corresponding to corners of the mouth of the consumer of the content. A plurality of face distances 512-526 may then be computed, wherein the face distance 512 is a distance between the points 502 and 504. The distance 514 is the distance between the point 502 and 508. The distance 516 is the distance between the point 508 and 510. The distance 518 is the distance between the point 510 and 504, and the distances 520, 522, 524, and 526 are the distances between the point 502, the point 504, the point 508, and the point 510, to the point 506, respectively. The feature extractor component 112 can also compute a plurality of face angles between lines connecting identified facial points.

Returning to FIG. 4, in order to capture temporal dynamics of face and head gestures, features with different functions can be aggregated over a short time window. For instance, for a head pose estimation feature, a histogram of state percentages can be created, which captures the proportion of frames the test subject 402 displayed each pose. For a remainder of the features, the aggregation functions can be, for example, mean, median, standard deviation, minimum value, maximum value, position of the minimum value, position of the maximum value, range (difference between maximum and minimum values), and number of zero crossings after mean subtraction. Different aggregation functions can potentially capture different characteristics of the temporal dynamics. For example, position of maximum value computed on the distance between the mouth points may indicate if the person is opening (e.g. maximum position at the end) or closing the mouth (e.g. position at the beginning). In another example, a number of zero crossings of the face position may represent an amount of movement of the person.

The system 400 may further include a learner component 414 that analyzes the labels 410 and corresponding features 412 to identify a set of features that can be used to best estimate engagement of persons, as well as weights to assign to features in the set of features. The learner component 414 can further learn such set of features based upon a time window over which labels are to be assigned (e.g., ten seconds, thirty seconds, one minute, five minutes, . . . ). The engagement estimator component 114 is thus learned to employ the set of features and associated weights to estimate engagement levels of persons.

In an exemplary embodiment, the learner component 414 can employ the forward feature selection method in connection with identifying a most discriminative subset of features to be used by the engagement estimator component 114 when estimating engagement of persons. Accordingly, the learner component 414 can begin with the most discriminative feature, iteratively add features to identify a set of features that yields highest performance. The method ceases if there are no additional features or the performance was better with a smaller subset of features. In an exemplary embodiment, features learned by the feature learner component 414 to cause the engagement estimator component 114 to best estimate engagement levels of consumers of content can include distances between facial points with mean aggregation, zero crossings of head size, and range of head roll. Such features can be selected based upon a window of time over which labels are to be assigned by the engagement estimator component 114. In an exemplary embodiment, the learner component 414 can learn the engagement estimator component 114 such that such component 114 assign labels on time windows of at least 1 minutes, such that temporal context can be taken into consideration by the engagement estimator component 114 when estimating a level of engagement of a consumer of content. The time window to be employed by the engagement estimator component 114 when assigning labels as to estimated engagement levels of consumers of content can be application-dependent. For instance, in safety scenarios, where predictions are time-critical and engagement levels tend to fluctuate faster, a smaller time window may be desired. In contrast, larger time windows can be more useful in market research scenarios were accurate positions are more important and engagement levels are likely to be measured over the duration of a stimulus (e.g., commercial advertisements or long television programs).

In other examples, the engagement estimator component 114 can be learned to consider context of displayed content, as well as temporal relationships with displayed content, when assigning labels as to estimated engagement levels of consumers of content. Accordingly, the engagement estimator component 114 can consider context, such that identical features/gestures in different contexts may be considered differently by the engagement estimator component 114. For example, a facial expression of a user indicating dissatisfaction when the user is watching a news program may indicate high engagement of the user with respect to the news program, while the same facial expression may indicate low engagement of the user when the user is watching a comedy program. Additional contextual information that can be considered by the engagement estimator component 114 includes, for example, time of day, number of distractors, location, weather, etc.

Figure 6:
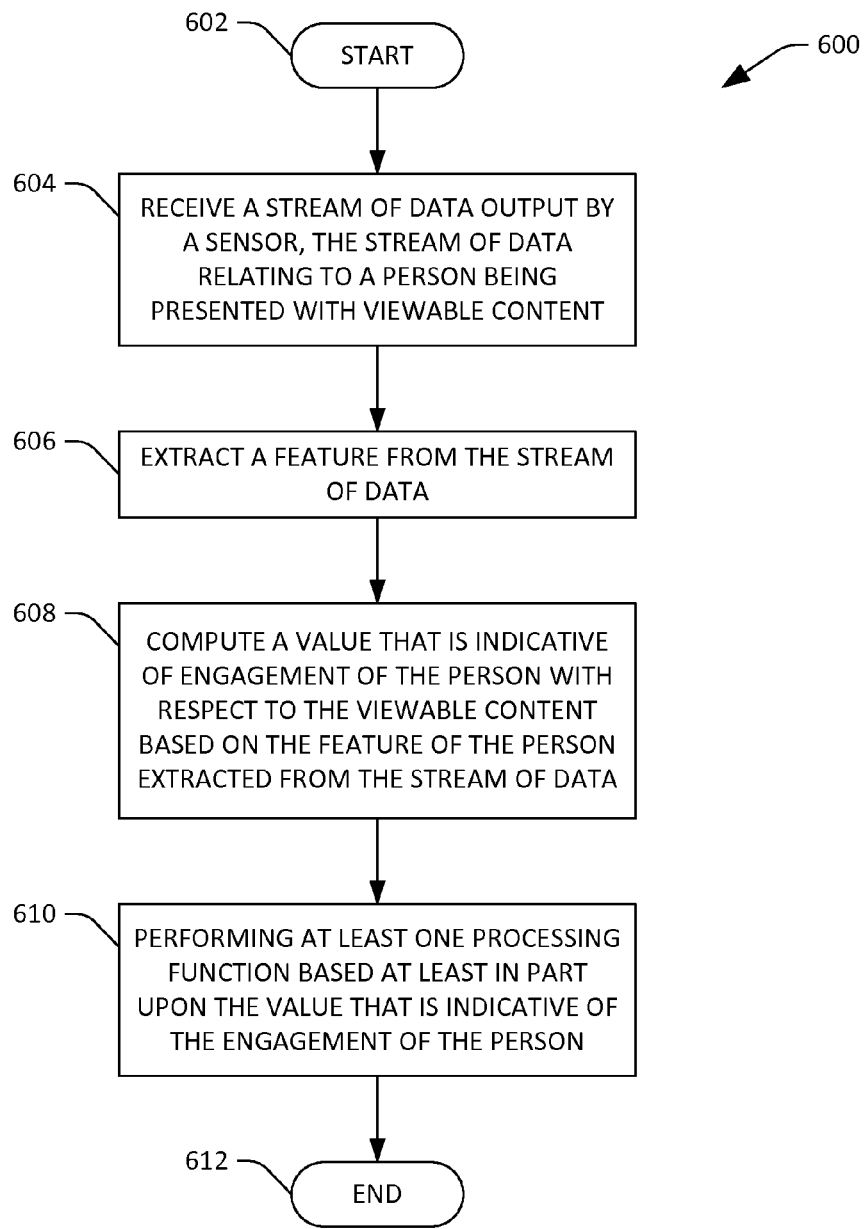
FIG. 6 is a flow diagram illustrating an exemplary methodology for computing a value that is indicative of engagement of a person with respect to content being presented thereto.
Figure 7:
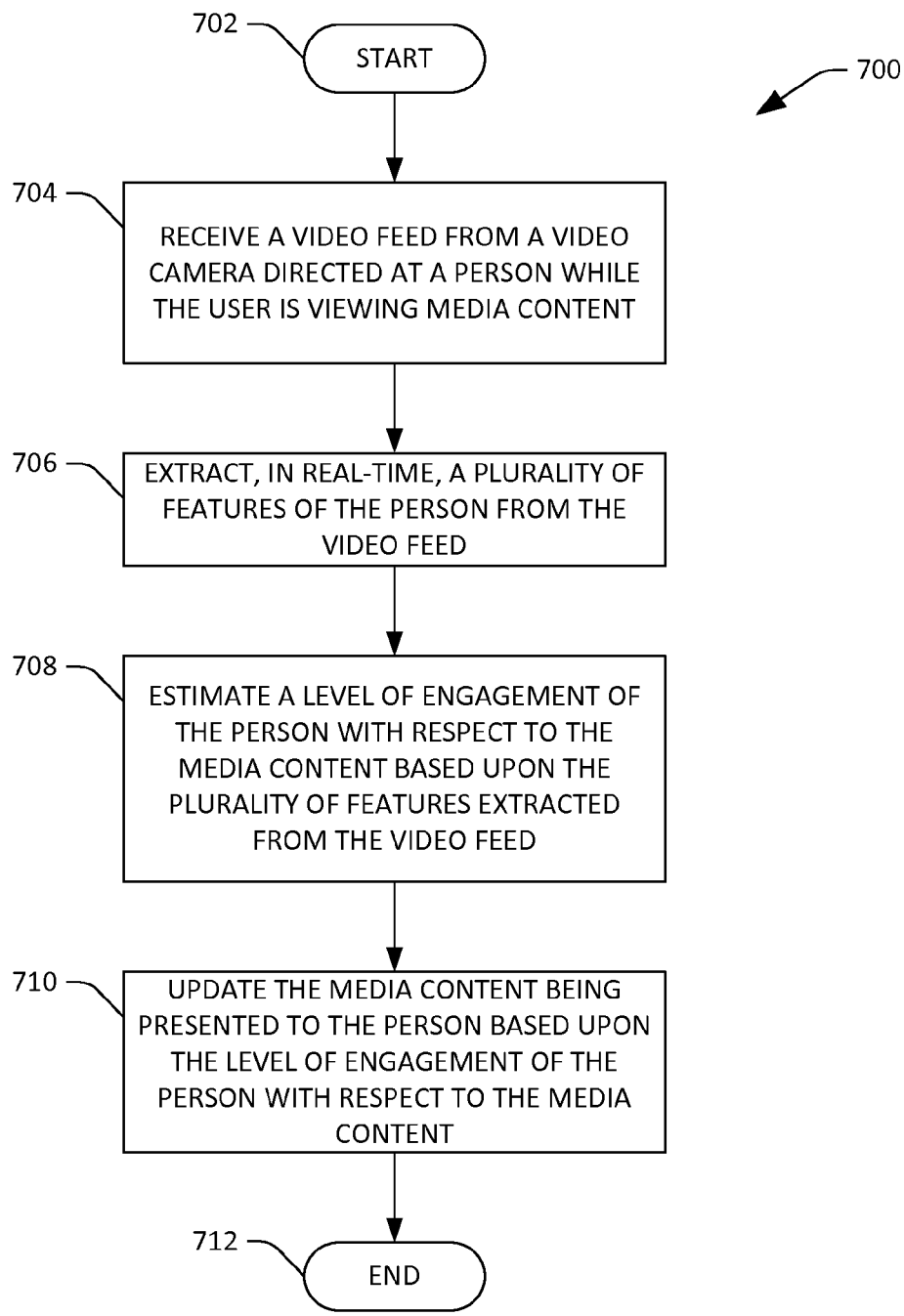
FIG. 7 is a flow diagram illustrating an exemplary methodology for estimating a level of engagement of a person with respect to media content presented thereto based upon a plurality of features extracted from a video feed.

FIGS. 6-7 illustrate exemplary methodologies relating to estimating engagement of consumers of content while being presented with such content. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 6, an exemplary methodology 600 that facilitates computing a value that is indicative of engagement of a person with respect to content presented thereto is illustrated. The methodology 600 starts at 602, and 604 a stream of data output by a sensor is received. The stream of data relates to a person who is being presented with viewable content, wherein the stream of data that is output by the sensor is done so without explicit feedback from the person. Moreover, the sensor may be nonintrusive, such that the person need not wear the sensor or be otherwise discomforted.

At 606, a feature is extracted from the stream of data based upon an analysis of such stream of data. For instance, in the instance where the stream of data is video data, a feature can be extracted from each frame.

At 608, a value that is indicative of an estimated engagement of the person with respect to the viewable content as the viewable content is being presented to the person is computed. The computing of such value is based at least in part upon the feature of the person extracted from the stream of data. As indicated above, such feature can be extracted over time, and thus, the value that is indicative of the estimated engagement of the person can be based upon a time series of feature values. At 610, at least one processing function is performed by a computer processor responsive to the value being computed at 608. As described above, such processing function can be transmitting a notification of the estimated engagement level of the viewer, updating a recommendation algorithm, providing updated content to the viewer, etc. The methodology 600 completes at 612.

Now referring to FIG. 7, an exemplary methodology 700 that facilitates estimating a level of engagement of a person with respect to media content is illustrated. The methodology 700 starts at 702, and 704 a video feed is received from a video camera, wherein the video camera is directed at a person while the person is viewing media content. Such video camera may be included in a sensor that is in communication with a gaming console, a video camera integral to a computing device, etc. At 706, a plurality of features are extracted in real-time from the video feed, wherein the plurality of features are features relating to the person. At 708, a level of engagement of the person is estimated with respect to the media content based upon the plurality of features extracted from the video feed, wherein the level of engagement is one of a plurality a predefined levels of engagement. In other words, a learned classifier can be employed to assign a classification as to the engagement of the person with respect to the media content.

At 710, the media content being presented to the person is updated based upon the level of the engagement of the person with respect to the media content estimated at 708. The methodology 700 completes at 712.

Figure 8:
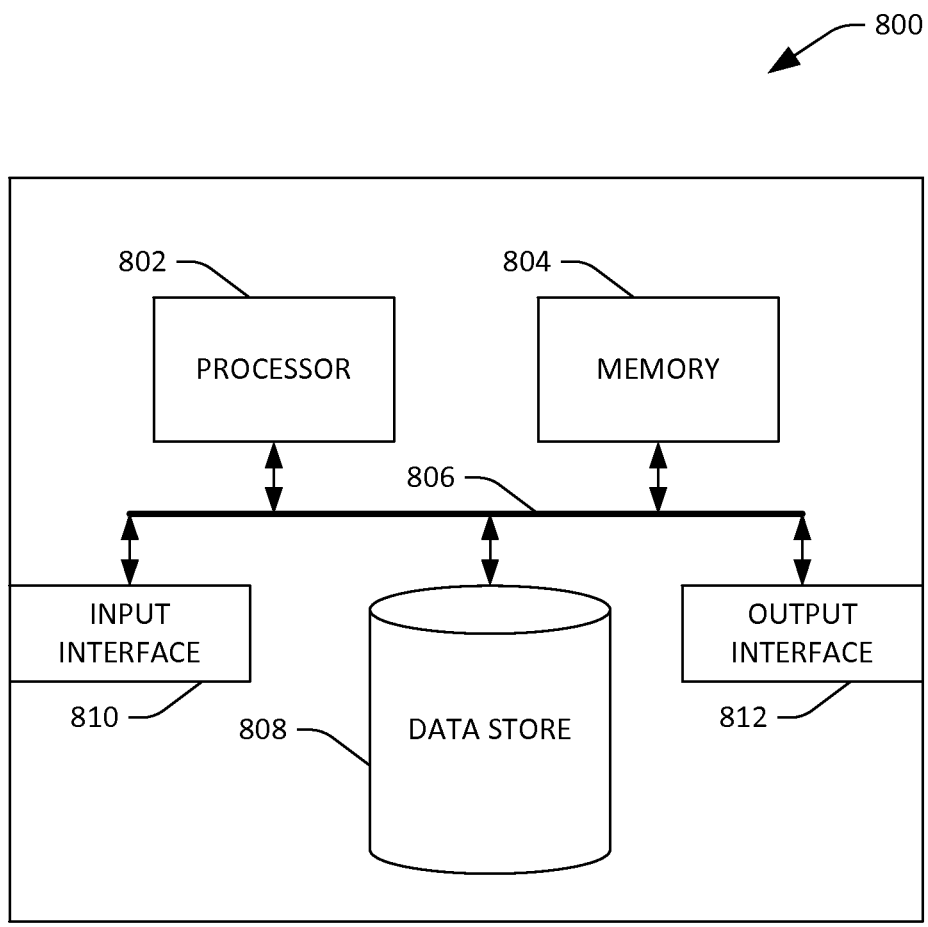
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that is configured to estimate a level of engagement of a person as the person is being presented with certain content. By way of another example, the computing device 800 can be used in a system that supports extracting features from sensor data. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store labels assigned to frames, feature values, etc.

The computing device 800 additionally includes a data store 808 that is accessible by the processor 802 by way of the system bus 806. The data store 808 may include executable instructions, features, sensor data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computer-executable method, comprising:
receiving a stream of data output by a sensor, the stream of data relating to a person who is being presented with viewable content;
extracting a feature of the person from the stream of data;
computing a value that is indicative of engagement of the person with respect to the viewable content as the viewable content is being presented to the person, the computing of the value based at least in part upon the feature of the person extracted from the stream of data, wherein the computing of the value that is indicative of the engagement of the person comprises:
analyzing the feature of the person over a predefined time window, wherein the feature is subject to alteration; and
computing the value that is indicative of the engagement of the person based upon the analyzing of the feature of the person over the predefined time window; and
responsive to computing the value, performing at least one processing function based at least in part upon the value that is indicative of the engagement of the person, the performing of the at least one processing function undertaken by a computer processor.

2. The computer-executable method of claim 1, wherein the stream of data is a video stream output by a video camera, and wherein the feature of the person extracted from the video stream is a facial feature.

3. The computer-executable method of claim 1, wherein the stream of data is a video stream output by a video camera, and wherein the feature of the person extracted from the video stream is a pose of the head of the person.

4. The computer-executable method of claim 1, wherein the viewable content is one of a movie, a television program, a video, a song, or an advertisement.

5. The computer-executable method of claim 1, wherein the at least one processing function comprises:
selecting an advertisement from a plurality of potential advertisements based upon the value that is indicative of the engagement of the person; and
causing the advertisement selected from the plurality of potential advertisements to be presented to the person.

6. The computer-executable method of claim 1, wherein computing the value that is indicative of the engagement of the person comprises classifying the engagement of the person into one of a plurality of predefined levels of engagement.

7. The computer-executable method of claim 1 configured for execution in a video game console.

8. The computer-executable method of claim 1, wherein the at least one processing function comprises outputting a recommendation to the person as to other content predicted to be of interest to the person.

9. The computer-executable method of claim 1, wherein the at least one processing function comprises determining an instance in time to present an advertisement to the person.

10. The computer-executable method of claim 1, wherein the viewable content is an advertisement, and wherein the at least one processing function comprises selecting a price to charge an advertiser of the advertisement from amongst a plurality of potential prices based at least in part upon the value that is indicative of the engagement of the person with respect to the advertisement.

11. The computer-executable method of claim 1, wherein the feature extracted from the stream of data relates to a skeletal pose of the person.

12. A computing device, comprising:
a receiver component that is configured to receive a stream of data from a sensor, the stream of data relating to a person being presented with content;
a feature extractor component that is configured to extract a feature of the person from the stream of data in real-time;
an engagement estimator component that is configured to estimate a level of engagement of the person with respect to the content being presented to the person based at least in part upon the feature extracted from the stream of data by the feature extractor component over a predefined window of time, wherein the computing device is configured to perform at least one computing function based upon the level of engagement estimated by the engagement estimator component.

13. The computing device of claim 12 being a gaming console, and the sensor being at least one of a video camera or a depth sensor.

14. The computing device of claim 12, further comprising a recommender component that is configured to perform the at least one computing function, the at least one computing function comprising output of a recommendation as to other content predicted to be of interest to the person based upon the level of engagement of the person with respect to the content being presented to the person estimated by the engagement estimator component.

15. The computing device of claim 12, further comprising an advertisement selector component that is configured to perform the at least one computing function, the at least one computing function comprising presentment of an advertisement to the person based upon the level of engagement of the person with respect to the content being presented to the person estimated by the engagement estimator component.

16. The computing device of claim 12, wherein the sensor is a video camera, the feature extractor component configured to extract, in real-time, a plurality of features, the plurality of features comprising: face distances, head pose, and head roll of the person in video data captured by the video camera, and the engagement estimator component configured to estimate the level of engagement of the person based upon the plurality of features.

17. The computing device of claim 12, wherein the content being presented to the person is one of a television program, a film, or an advertisement.

18. The computing device of claim 12, wherein the engagement estimator component is configured to output real-time feedback as to the level of engagement of the person to a provider of the content, the content being a speech or lecture.

19. A computer-readable storage medium comprising instructions that, when executed by a processor, cause the processor to perform acts comprising:

receiving, from a video camera, a video feed directed at a person while the person is viewing media content;

extracting, in real-time, a plurality of features of the person from the video feed, the plurality of features comprising face distances identified in the video feed;

estimating a level of engagement of the person with respect to the media content based upon the plurality of features extracted from the video feed over a predefined window of time, the level of engagement being one of a plurality of predefined levels of engagement; and updating the media content being viewed by the person based upon the level of engagement of the person estimated with respect to the media content.

20. The computing device of claim 12, the engagement estimator component further configured to estimate the level of engagement of the person with respect to the content being presented to the person based upon the content being presented to the person.

* * * * *